US00RE47957E

(19) United States
(12) Reissued Patent
Liao et al.

(10) Patent Number: US RE47,957 E
(45) Date of Reissued Patent: Apr. 21, 2020

(54) KEYSWITCH, KEYBOARD AND KEYSWITCH MANUFACTURING METHOD THEREOF

(71) Applicant: DARFON ELECTRONICS CORP., Taoyuan (TW)

(72) Inventors: Pen-Hui Liao, Taoyuan (TW); Chin-Hung Lin, Taoyuan (TW); Hsin-Hung Liu, Taoyuan (TW); I-Chu Kuo, Taoyuan (TW); Yu-Ming Huang, Taoyuan (TW)

(73) Assignee: DARFON ELECTRONICS CORP., Taoyuan (TW)

(21) Appl. No.: 16/109,619

(22) Filed: Aug. 22, 2018

Related U.S. Patent Documents

Reissue of:
(64) Patent No.: 9,966,202
Issued: May 8, 2018
Appl. No.: 15/650,982
Filed: Jul. 17, 2017

(30) Foreign Application Priority Data

Jul. 20, 2016 (TW) ..... 105122812 A

(51) Int. Cl.
*H01H 3/12* (2006.01)
*G06F 3/02* (2006.01)
*H01H 13/88* (2006.01)

(52) U.S. Cl.
CPC ..... *H01H 3/12* (2013.01); *G06F 3/0202* (2013.01); *H01H 3/125* (2013.01); *H01H 13/88* (2013.01);

(Continued)

(58) Field of Classification Search
CPC ..... H01H 3/12; H01H 2/125; H01H 13/88; H01H 2215/042; H01H 2221/04; G06F 3/0202

(Continued)

(56) References Cited

U.S. PATENT DOCUMENTS 5,424,516 A * 6/1995 Emmons ..... H01H 3/125 200/341
8,970,331 B2 * 3/2015 Chang ..... H01H 13/702 200/341

(Continued)

FOREIGN PATENT DOCUMENTS

CN 104538228 A 4/2015
CN 103390514 B 3/2016

(Continued)

*Primary Examiner* — Kenneth Whittington
(74) *Attorney, Agent, or Firm* — Winston Hsu

(57) ABSTRACT

A keyswitch includes a cap, a support structure, a first magnet, and a baseplate having a bending arm protruding from the baseplate and a support rib extending horizontally to form a receiving space with the bending arm. The support structure includes a first support member pivoted to the baseplate and against the cap and a magnetic permeable plate extending from the first support member and being above the receiving space. The first magnet is inserted into the receiving space to be supported by the support rib and be pressed by the bending arm. When the cap is pressed to make the magnetic permeable plate away from the first magnet as the first support member rotates, the cap moves to a pressed position. When the cap is released, a magnetic attraction force between the magnetic permeable plate and the first magnet drives the magnetic permeable plate to approach the first magnet.

22 Claims, 19 Drawing Sheets

(52) U.S. Cl.
CPC ... *H01H 2215/042* (2013.01); *H01H 2221/04* (2013.01)

(58) Field of Classification Search
USPC ..... 200/341, 344; 335/205
See application file for complete search history.

(56) References Cited

U.S. PATENT DOCUMENTS

| | | | | |
|---|---|---|---|---|
| 2012/0313738 | A1 | 12/2012 | Chang | |
| 2014/0151204 | A1* | 6/2014 | Chen | H01H 13/02 200/310 |

FOREIGN PATENT DOCUMENTS

| | | | |
|---|---|---|---|
| CN | 105826115 | A | 8/2016 |
| TW | 201316200 | A1 | 4/2013 |
| TW | I452486 | B | 9/2014 |
| TW | 201543272 | A | 11/2015 |
| TW | I523055 | B | 2/2016 |
| TW | 201621951 | A | 6/2016 |

* cited by examiner

KEYSWITCH, KEYBOARD AND KEYSWITCH MANUFACTURING METHOD THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present invention relates to a keyswitch, a keyboard and a keyswitch manufacturing method thereof, and more specifically, to a keyswitch inserting a magnet into a receiving space cooperatively formed by a support rib and a bending arm on a baseplate laterally for fixing the magnet on the baseplate, a keyboard and a keyswitch manufacturing method thereof.

2. Description of the Prior Art

A keyboard, which is the most common input device, can be found in variety of electronic apparatuses for users to input characters, symbols, numerals and so on. Furthermore, consumer electronic products and industrial machine tools are all equipped with a keyboard for performing input operations.

A conventional keyswitch usually utilizes assembly of a scissor support structure and an elastic member to provide a cap with an elastic force for driving the cap to return to a released position. However, since the scissor mechanical design adopted by the scissor support structure requires more space so as to further increase the overall height of the keyswitch, it is disadvantageous to the thinning design of the keyswitch. A conventional method for solving the aforesaid problem is to utilize a magnetic attraction force generated by magnetic members respectively disposed on a support structure and a baseplate as a returning force of the cap instead of the aforesaid scissor mechanical design. However, in the aforesaid magnetic attraction design, it is not easy to position the magnetic members on the baseplate if the baseplate is made of low intensity magnetic material or non-magnetic material (e.g. plastic), so as to cause a time-consuming and strenuous assembly process.

SUMMARY OF THE INVENTION

The present invention provides a keyswitch including a baseplate, a cap, a support structure, and a first support member. The baseplate extends along a plane defined by an X-axis and a Y-axis perpendicular to each other and has at least one bending arm and at least one support rib. A Z-axis is perpendicular to the X-axis and the Y-axis. The at least one bending arm protrudes from the baseplate along the Z-axis. The at least one support rib extends along the plane defined by the X-axis and the Y-axis to form a receiving space cooperatively with the at least one bending arm. The support structure is disposed between the baseplate and the cap. The support structure includes a first support member and a magnetic permeable plate. The first support member is movably connected to the baseplate and the cap to make the cap move with the support structure between a released position and a pressed position. The magnetic permeable plate extends from the first support member and is positioned above the receiving space. The first magnet is laterally inserted into the receiving space along the plane defined by the X-axis and the Y-axis. The first magnet has a bottom surface and a lateral surface. The bottom surface is supported by the at least one support rib. The lateral surface is pressed by the at least one bending arm laterally. When the cap is released, a magnetic attraction force between the first magnet and the magnetic permeable plate keeps the cap at the released position. When the cap is pressed by an external force to make the magnetic permeable plate away from the first magnet with rotation of the first support member, the cap moves from the released position toward the pressed position.

The present invention further provides a keyboard including a baseplate and a plurality of keyswitches. The baseplate extends along a plane defined by an X-axis and a Y-axis perpendicular to each other and has at least one bending arm and at least one support rib. A Z-axis is perpendicular to the X-axis and the Y-axis. The at least one bending arm protrudes from the baseplate along the Z-axis. The at least one support rib extends along the plane defined by the X-axis and the Y-axis to form a receiving space cooperatively with the at least one bending arm. The plurality of keyswitches is disposed on the baseplate. At least one of the plurality of keyswitches includes a cap, a support structure, and a first magnet. The support structure is disposed between the baseplate and the cap. The support structure includes a first support member and a magnetic permeable plate. The first support member is movably connected to the baseplate and the cap to make the cap move with the support structure between a released position and a pressed position. The magnetic permeable plate extends from the first support member and is positioned above the receiving space. The first magnet is laterally inserted into the receiving space along the plane defined by the X-axis and the Y-axis. The first magnet has a bottom surface and a lateral surface. The bottom surface is supported by the at least one support rib. The lateral surface is pressed by the at least one bending arm laterally. When the cap is released, a magnetic attraction force between the first magnet and the magnetic permeable plate keeps the cap at the released position. When the cap is pressed by an external force to make the magnetic permeable plate away from the first magnet with rotation of the first support member, the cap moves from the released position to the pressed position.

The present invention further provides a keyswitch manufacturing method for manufacturing a keyswitch. The keyswitch provides a pressing resistance force or a returning force to a cap via a magnetic attraction force of a magnetic member. The keyswitch manufacturing method includes providing a baseplate having a receiving space having an opening located at a side of the receiving space not facing the cap, providing an elastic member disposed on the baseplate to be adjacent to the opening, pushing the magnetic member against the elastic member to deform the elastic member away from the opening so as to guide the magnetic member to move toward the receiving space via the opening, and pushing the magnetic member into the receiving space to release deformation of the elastic member, so as to make the elastic member return to its original position to abut against a side of the magnetic member for preventing the magnetic member from leaving the receiving space via the opening.

The present invention further provides a keyswitch. The keyswitch includes a cap, a baseplate, a support structure, and a magnetic member. The baseplate has a main body, an elastic member, a plurality of blocking members, a receiving space, and an assembly path space. The main body partially extends under the receiving space. The elastic member is disposed on the main body and extends into the assembly path space. The elastic member has a first height in an undeformed state. The assembly path space has at least one blocking side and an opening. The plurality of blocking members is disposed at the at least one blocking side. The opening is disposed at a position different from the at least one blocking side. The support structure is disposed between the baseplate and the cap. The support structure includes a first support member and a magnetic permeable plate. The first support member is movably connected to the baseplate and the cap to make the cap move with the support structure between a released position and a pressed position. The magnetic permeable plate extends from the first support member and is positioned above the receiving space. The magnetic member passes through the opening along the assembly path space to enter the receiving space where the plurality of blocking members engages with the magnetic member. During the magnetic member passes through the opening, the magnetic member enters the assembly path space to deform the elastic member to a second height lower than the first height, so as to allow the magnetic member to pass through the opening along the assembly path space. After the magnetic member passes through the opening, the magnetic member leaves the assembly path space to release deformation of the elastic member, so as to make the elastic member return to the first height for preventing the magnetic member from leaving the receiving space via the assembly path space. When the cap is released, a magnetic attraction force between the magnetic member and the magnetic permeable plate keeps the cap at the released position. When the cap is pressed by an external force to make the magnetic permeable plate away from the magnetic member with rotation of the first support member, the cap moves from the released position toward the pressed position.

The present invention further provides a keyswitch includes a cap, a baseplate, a support structure, and a magnetic member. The baseplate has a main body, an elastic member, a plurality of blocking members, a receiving space, and an assembly path space. The main body partially extends under the receiving space. The elastic member is disposed on the main body and extends into the assembly path space. The elastic member has a first interference in an undeformed state with the assembly path space. The assembly path space has at least one blocking side and an opening. The plurality of blocking members is disposed at the at least one blocking side. The opening is disposed at a position different from the at least one blocking side. The support structure is disposed between the baseplate and the cap. The support structure includes a first support member and a magnetic permeable plate. The first support member is movably connected to the baseplate and the cap to make the cap move with the support structure between a released position and a pressed position. The magnetic permeable plate extends from the first support member. The magnetic member passes through the opening along the assembly path space to enter the receiving space where the plurality of blocking members engages with the magnetic member. During the magnetic member passes through the opening, the magnetic member enters the assembly path space to deform the elastic member to have a second interference with the assembly path space, so as to allow the magnetic member to pass through the opening along the assembly path space, and the second interference is less than the first interference. After the magnetic member passes through the opening, the magnetic member leaves the assembly path space to release deformation of the elastic member, so as to make the elastic member return to have the first interference for preventing the magnetic member from leaving the receiving space via the assembly path space. When the cap is released, a magnetic attraction force between the magnetic member and the magnetic permeable plate keeps the cap at the released position. When the cap is pressed by an external force to make the magnetic permeable plate away from the magnetic member with rotation of the first support member, the cap moves from the released position toward the pressed position.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
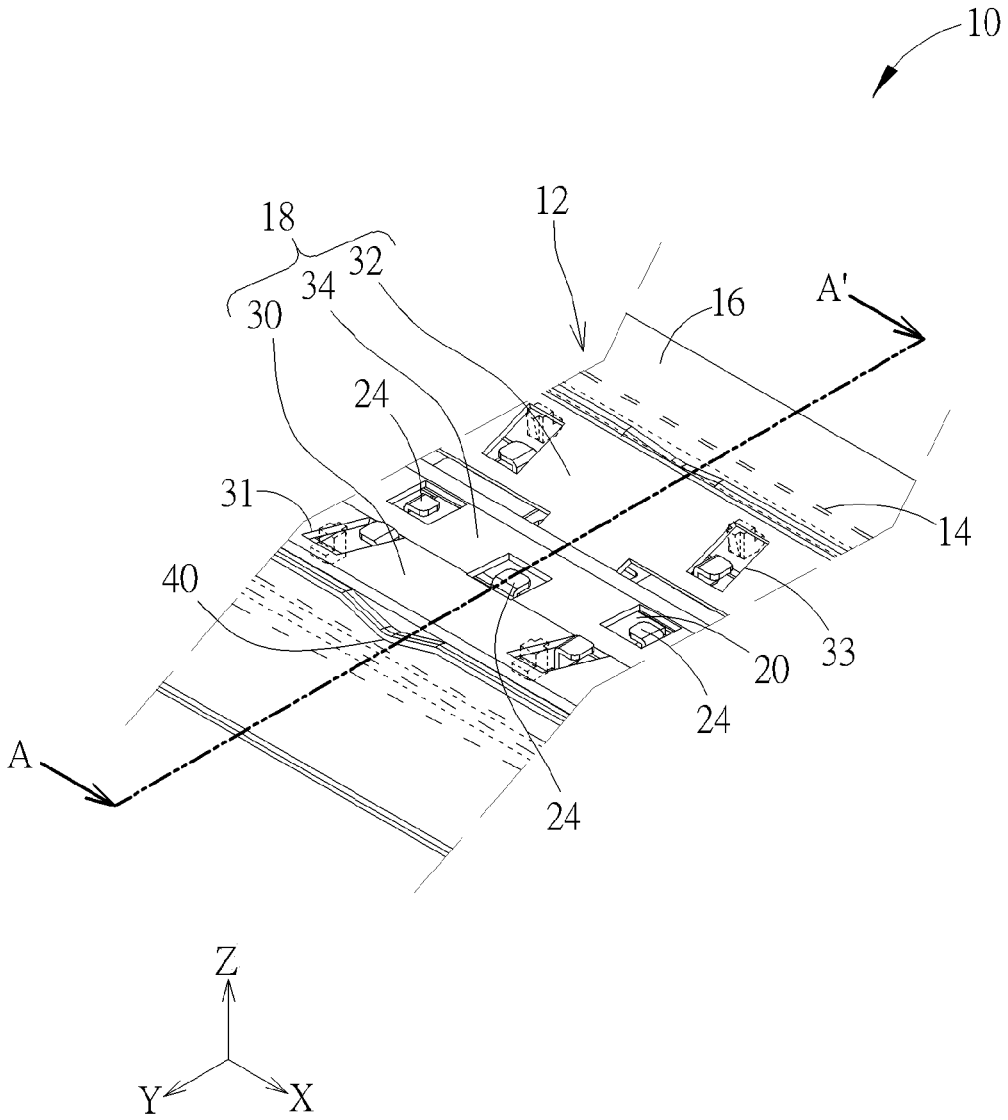
FIG. 1 is a partial enlarged diagram of a keyboard according to an embodiment of the present invention.

Please refer to FIG. 1, which is a partial enlarged diagram of a keyboard 10 according to an embodiment of the present invention. For clearly showing the mechanical design of a keyswitch 12, a cap 14 is briefly depicted by dotted lines in FIG. 1. As shown in FIG. 1, the keyboard 10 includes a plurality of keyswitches 12 (only one keyswitch 12 shown in FIG. 1, but not limited thereto) and a baseplate 16. The plurality of keyswitches 12 is disposed on the baseplate 16 for a user to perform input operations. The keyswitch 12 includes the cap 14, a support structure 18, a first magnet 20, and a second magnet 22. The keyboard 10 could be applied to a portable electronic device with a foldable mechanism composed of an upper cover and a lower casing (e.g. a notebook or a foldable keyboard device).

Figure 2:
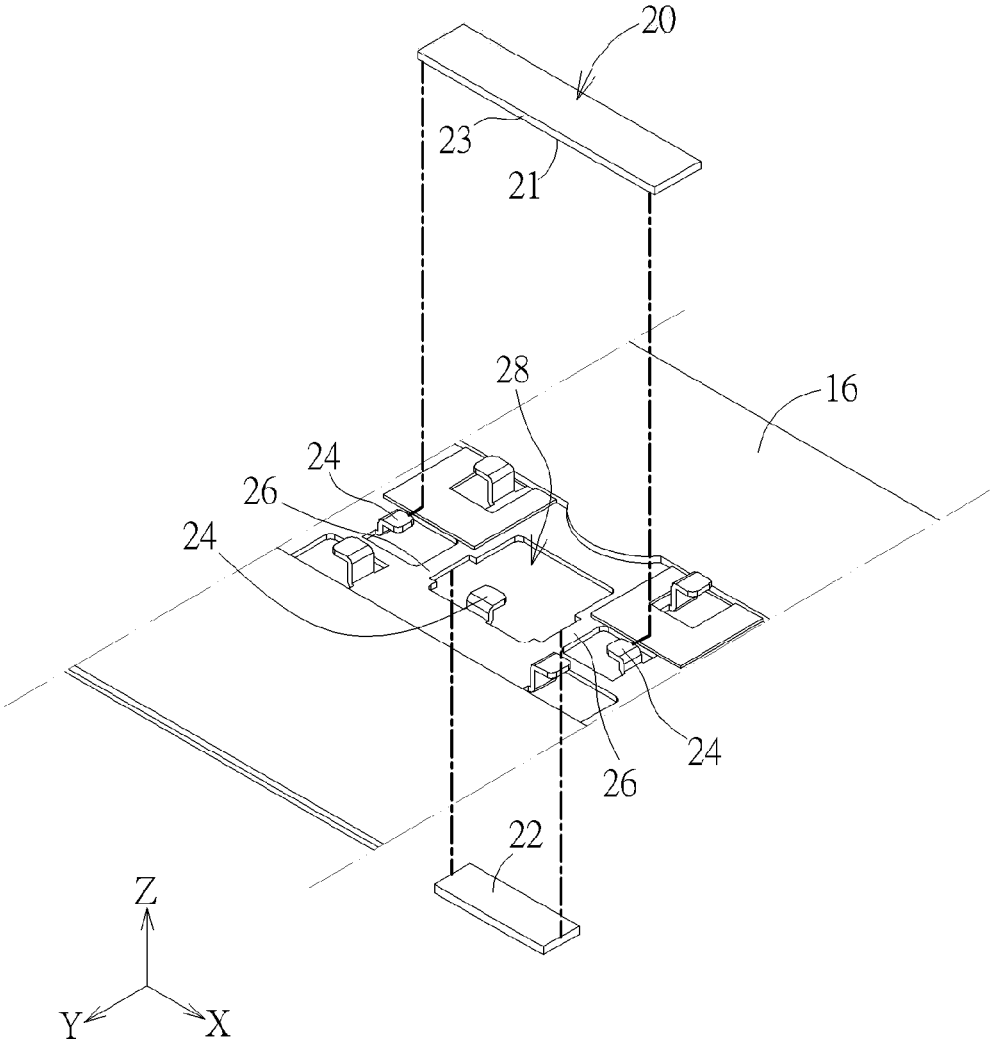
FIG. 2 is an exploded diagram of a baseplate, a first magnet and a second magnet in FIG. 1.
Figure 3:
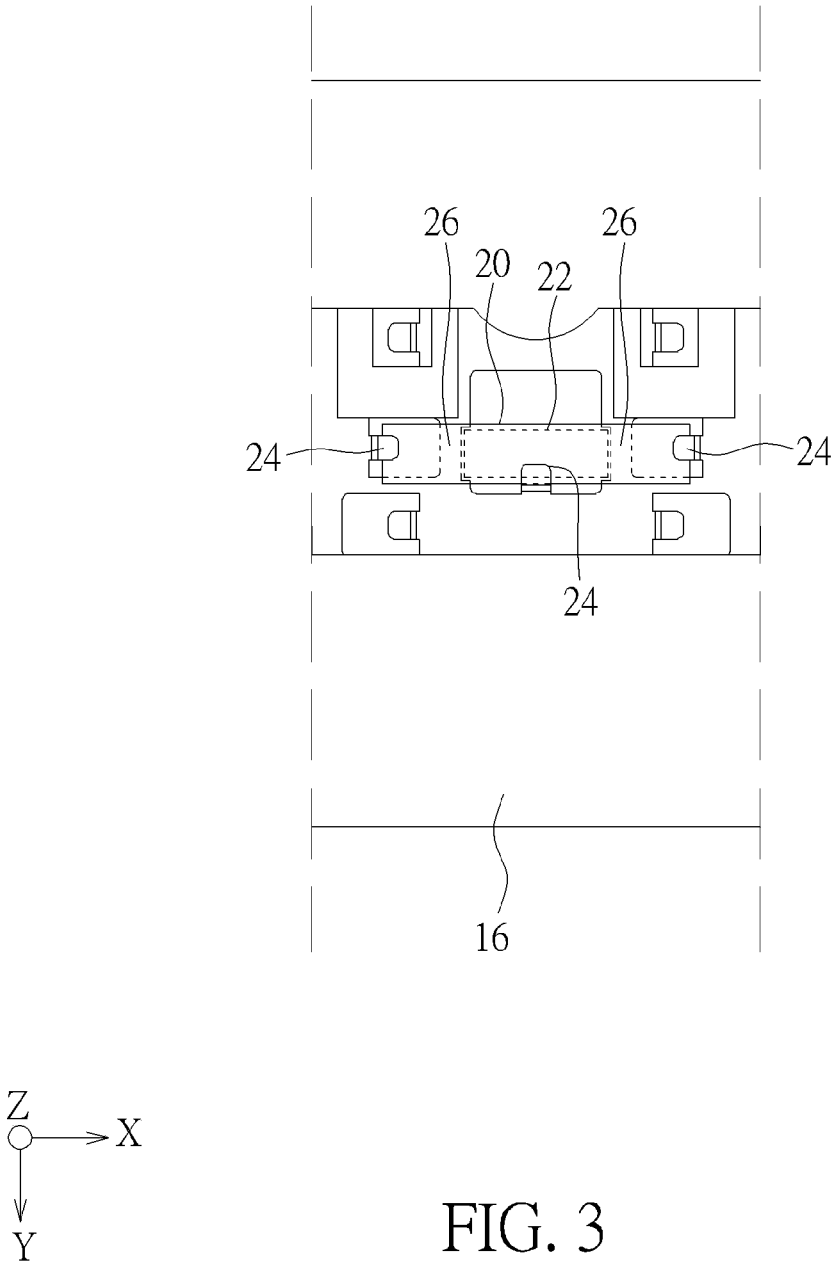
FIG. 3 is a top view of the first magnet and the second magnet in FIG. 2 being disposed on the baseplate.
Figure 4:
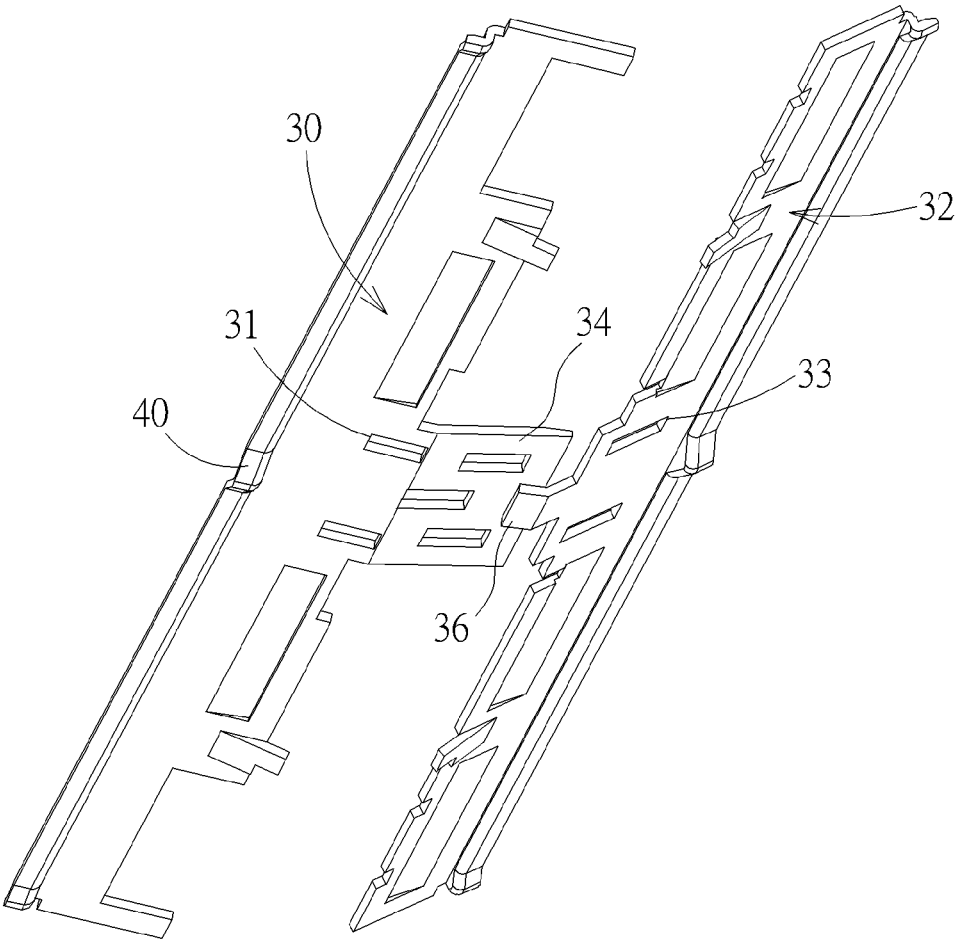
FIG. 4 is an enlarged diagram of a first support member and a second support member in FIG. 1 from another viewing angle.
Figure 5:
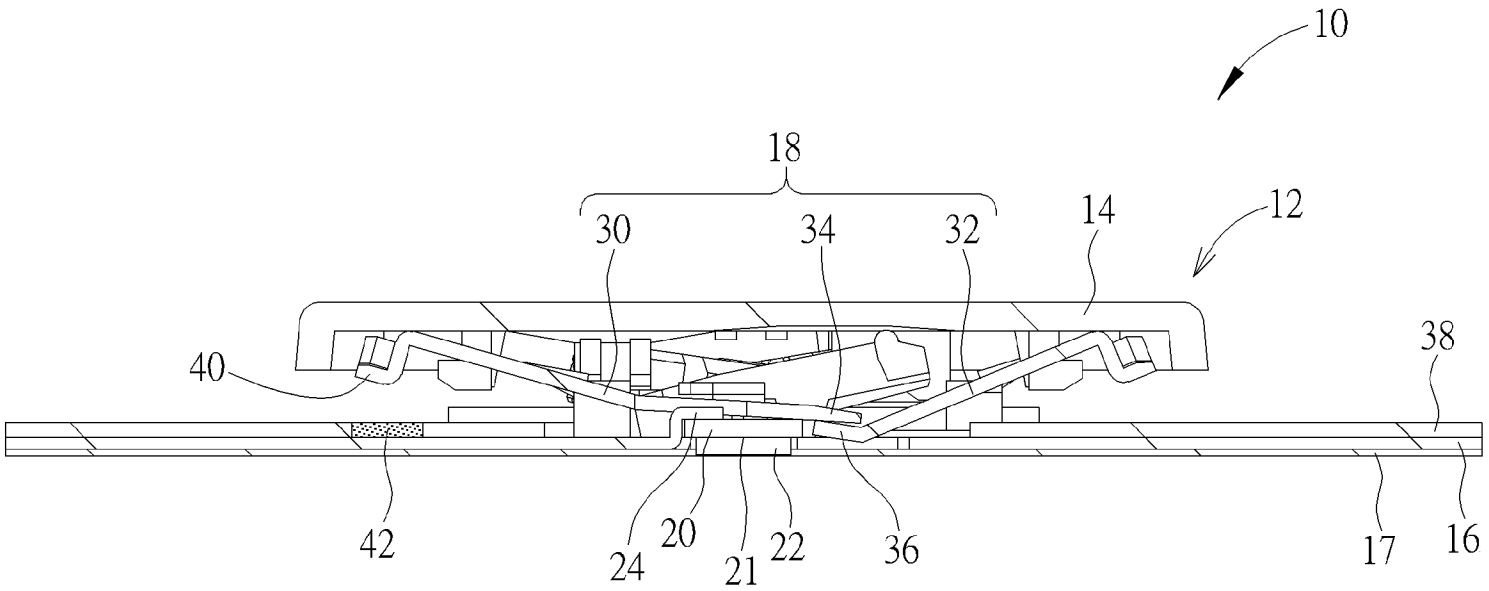
FIG. 5 is a cross-sectional diagram of the keyboard in FIG. 1 along a cross-sectional line A-A'.
Figure 6:
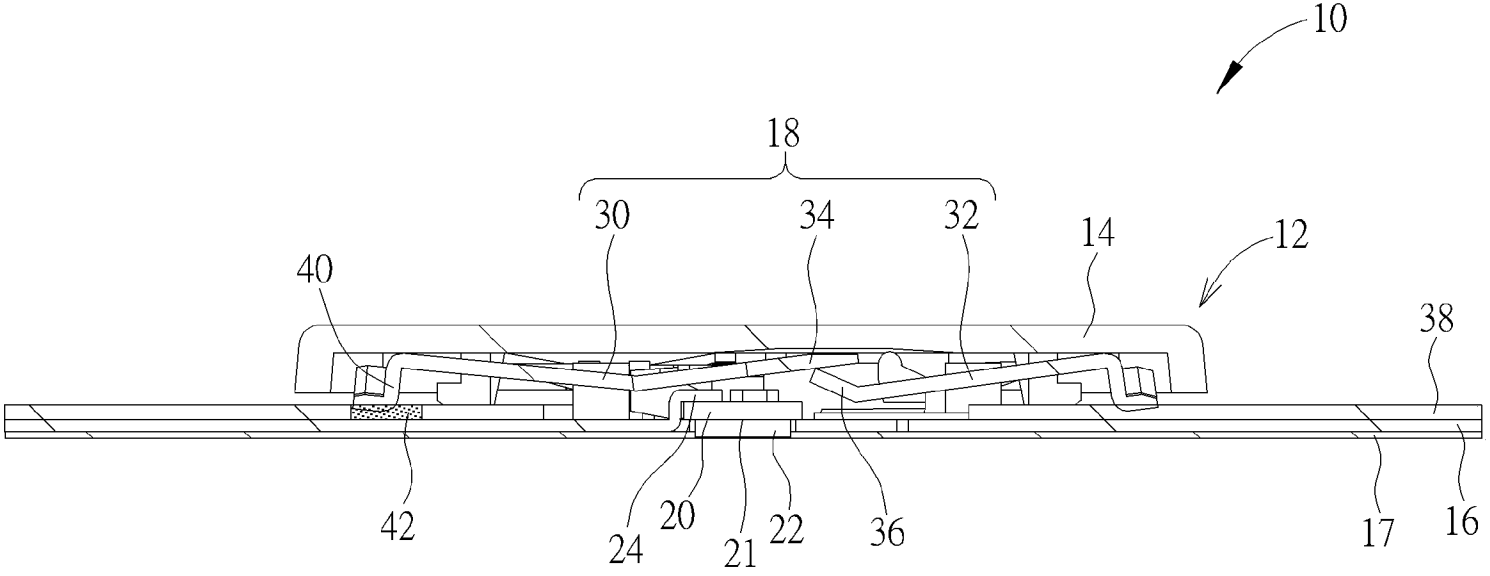
FIG. 6 is a cross-sectional diagram of a cap in FIG. 5 being pressed.

Please refer to FIG. 1, FIG. 2, FIG. 3, FIG. 4, FIG. 5, and FIG. 6. FIG. 2 is an exploded diagram of the baseplate 16, the first magnet 20 and the second magnet 22 in FIG. 1. FIG. 3 is a top view of the first magnet 20 and the second magnet 22 in FIG. 2 being disposed on the baseplate 16. FIG. 4 is an enlarged diagram of a first support member 30 and a second support member 32 in FIG. 1 from another viewing angle. FIG. 5 is a cross-sectional diagram of the keyboard 10 in FIG. 1 along a cross-sectional line A-A'. FIG. 6 is a cross-sectional diagram of the cap 14 in FIG. 5 being pressed. The baseplate 16 extends along a plane defined by an X-axis and a Y-axis perpendicular to each other and has at least one bending arm 24 (three shown in FIG. 2, but not limited thereto) and at least one support rib 26 (two shown in FIG. 2, but not limited thereto). A Z-axis is perpendicular to the X-axis and the Y-axis. The bending arm 24 protrudes from the baseplate 16 along the Z-axis. The support rib 26 extends along the plane defined by the X-axis and the Y-axis to form a receiving space 28 cooperatively with the bending arm 24. The support structure 18 is disposed between the baseplate 16 and the cap 14. The cap 14 is movable between a released position as shown in FIG. 5 and a pressed position as shown in FIG. 6 relative to the baseplate 16 via the support structure 18. To be more specific, the support structure 18 includes the first support member 30, the second support member 32 opposite to each other, and a magnetic permeable plate 34. The first support member 30 is movably connected to the baseplate 16 and the cap 14 (e.g. the baseplate 16 and the cap 14 is partially disposed through a first opening portion 31 of the first support member 30 to make the first support member 30 movably connected to the baseplate 16 and the cap 14, but not limited thereto). The magnetic permeable plate 34 extends from the first support member 30 and is positioned above the receiving space 28. The second support member 32 is movably connected to the baseplate 16 and the cap 14 (e.g. the baseplate 16 and the cap 14 is partially disposed through a second opening portion 33 of the second support member 32 to make the second support member 32 movably connected to the baseplate 16 and the cap 14, but not limited thereto). An abutting portion 36 extends from the second support member 32 toward the first support member 30 to support the magnetic permeable plate 34 (as shown in FIG. 4).

In this embodiment, as shown in FIG. 2, FIG. 3, FIG. 4, FIG. 5, and FIG. 6, the keyswitch 12 adopts a magnetic returning design. The first magnet 20 is laterally inserted into the receiving space 28 along the plane defined by the X-axis and the Y-axis to be supported by the support rib 26 and laterally abut against the bending arm 24, so as to be fixed on the baseplate 16 (as shown in FIG. 3, the keyswitch 12 could adopt the design that the bending arm 24 and the support rib 26 clamp the first magnet 20 cooperatively in a tightly fitting manner, but not limited thereto). In other words, the first magnet 20 has a bottom surface 21 and a lateral surface 23. The bottom surface 21 is supported by the support rib 26. The lateral surface 23 is pressed by the bending arm 24 laterally. The second magnet 22 is magnetically attracted to the bottom surface 21 of the first magnet 20 opposite to the support structure 18 (as shown in FIG. 5) to enhance a magnetic attraction force for the magnetic permeable plate 34. When the cap 14 is released, the magnetic attraction force generated by the first magnet 20 and the second magnet 22 keeps the cap 14 at the released position as shown in FIG. 5. When the cap 14 is pressed by an external force to make the magnetic permeable plate 34 away from the first magnet 20 with rotation of the first support member 30 and the second support member 32 relative to the baseplate 16 and keep the abutting portion 36 tilted, the cap 14 moves from the released position as shown in FIG. 5 to the pressed position as shown in FIG. 6 with the support structure 18 to complete the triggering operation and execute a corresponding input function. When the external force is released, the magnetic attraction force makes the magnetic permeable plate 34 return to be adjacent to the first magnet 20. Accordingly, the cap 14 could move from the pressed position as shown in FIG. 6 back to the released position as shown in FIG. 5 with the support structure 18, so that the cap 14 could automatically return to its original position.

To be noted, the second support member 32 and the second magnet 22 could be omissible components for simplifying the mechanical design of the keyswitch 12 and reducing the space occupied by the support structure and the magnet. Furthermore, in practical application, the keyboard 10 could further include a mylar film 17. The mylar film 17 is attached under the baseplate 16 (as shown in FIG. 5 and FIG. 6), so that the second magnet 22 could be disposed on the bottom surface 21 of the first magnet 20 more steadily.

The triggering design of the cap 14 could be as shown in FIG. 4, FIG. 5, and FIG. 6. The keyswitch 10 could further include a membrane circuit board 38. The first support member 30 has a protruding point 40. The membrane circuit board 38 is disposed on the baseplate 16 and has a triggering switch 42 corresponding to the protruding point 40. In such a manner, when the cap 14 moves to the pressed position as shown in FIG. 6 relative to the baseplate 16 via the support structure 18, the protruding point 40 presses the triggering switch 42 for triggering the membrane circuit board 38 to complete the triggering operation and execute a corresponding input function. The aforesaid triggering design could also be applied to the second support member 32, and the related description could be reasoned from analogy according to the aforesaid embodiment and omitted herein.

In summary, the present invention adopts the design that the magnet is laterally inserted into the receiving space formed by the support rib and the bending arm on the baseplate. Accordingly, even if the baseplate is made of low intensity magnetic material (or non-magnetic material), the keyswitch provided by the present invention could fix the magnet on the baseplate steadily, to solve the prior art problem that positioning the magnetic member on the baseplate is not easy if the baseplate is made of low intensity magnetic material or non-magnetic material (e.g. plastic), so that the present invention could improve convenience of the keyboard in assembly and manufacturing.

Figure 7:
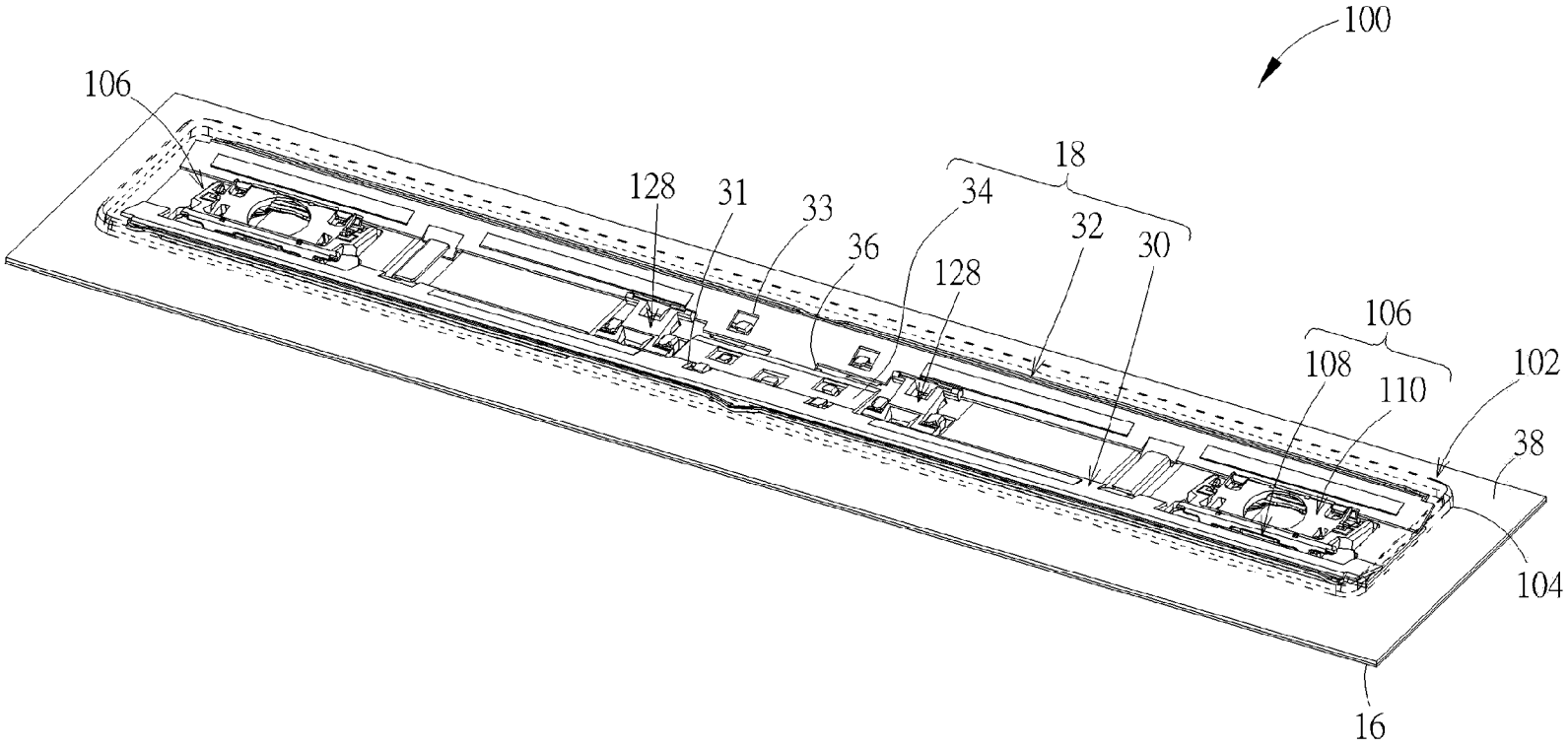
FIG. 7 is a diagram of a keyboard according to another embodiment of the present invention.
Figure 8:
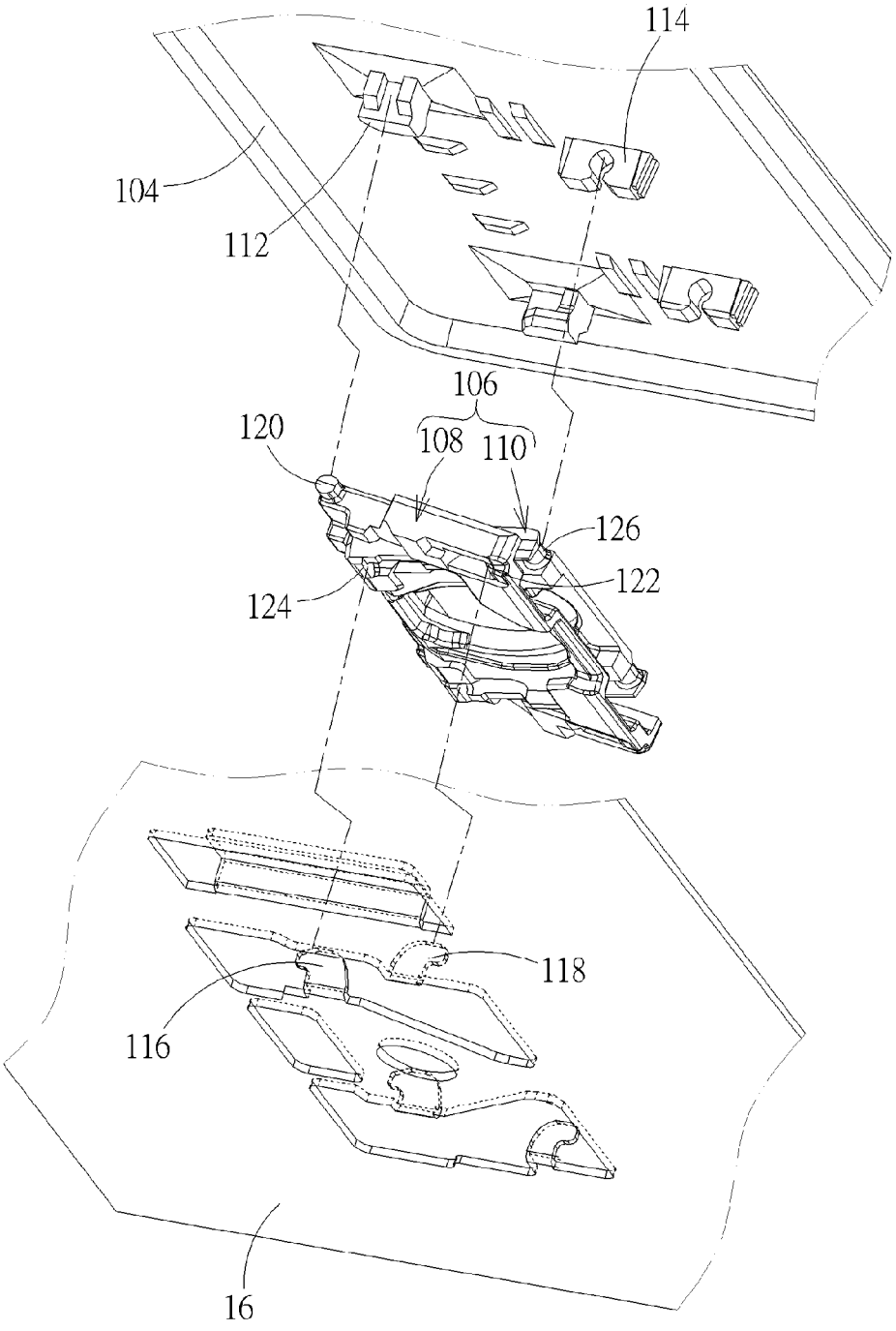
FIG. 8 is an exploded diagram of the baseplate, a cap, and a scissor support mechanism in FIG. 7.

It should be mentioned that the aforesaid design could be applied to a keyswitch with a longer length (or called a multiple-width keyswitch). For example, please refer to FIG. 7 and FIG. 8. FIG. 7 is a diagram of a keyboard 100 according to another embodiment of the present invention. FIG. 8 is an exploded diagram of the baseplate 16, a cap 104, and a scissor support mechanism 106 in FIG. 7. For clearly showing the mechanical design of the keyswitch 102, the cap 104 is briefly depicted by dotted lines in FIG. 7. Components both mentioned in this embodiment and the aforesaid embodiment represent components with similar structures or functions, and the related description is omitted herein. The keyboard 100 includes a plurality of keyswitches 102 (only one shown in FIG. 7) and the baseplate 16. The keyswitch 102 is disposed on the baseplate 16 for a user to perform a corresponding input operation. The keyswitch 102 includes the cap 104, at least one scissor support mechanism 106 (two shown in FIG. 7, but not limited thereto), the support structure 18, the first magnet 20 and the second magnet 22. To be noted, the first magnet 20 and the second magnet 22 are not shown in FIG. 7, and the related description could be as shown in FIG. 2 and FIG. 3.

In this embodiment, the first support member 30, the second support member 32, and the cap 104 could be strip-shaped. The scissor support mechanism 106 is located between the first support member 30 and the second support member 32 and is movably connected to the cap 104 and the baseplate 16. To be more specific as shown in FIG. 8, the scissor support mechanism 106 could include a first frame 108 ad a second frame 110. The cap 104 could have a first sliding slot 112 and a first engaging slot 114. The baseplate 16 could have a second sliding slot 116 and a second engaging slot 118. The first frame 108 could have a first sliding portion 120 and a first pivot portion 122. The first sliding portion 120 is slidably disposed in the first sliding slot 112, and the first pivot portion 122 is rotatably connected to the second engaging slot 118. The second frame 110 could have a second sliding portion 124 and a second pivot portion 126. The second sliding portion 124 is slidably disposed in the second sliding slot 116, and the second pivot portion 126 is rotatably connected to the first engaging slot 114. In such a manner, during the cap 104 moves between the released position and the pressed position, the aforesaid connection design could generate the effect that a side portion of the cap 104 could move together with a center portion of the cap 104 via the first frame 108 and the second frame 110. Furthermore, the aforesaid connection design could also increase the pull-out force of the cap 104 via connection of the first sliding portion 120 and the first sliding slot 112 and connection of the second pivot portion 126 and the first engaging slot 114 to efficiently solve the prior art problem that the cap of the conventional multiple-width keyswitch could fall off easily.

Figure 9:
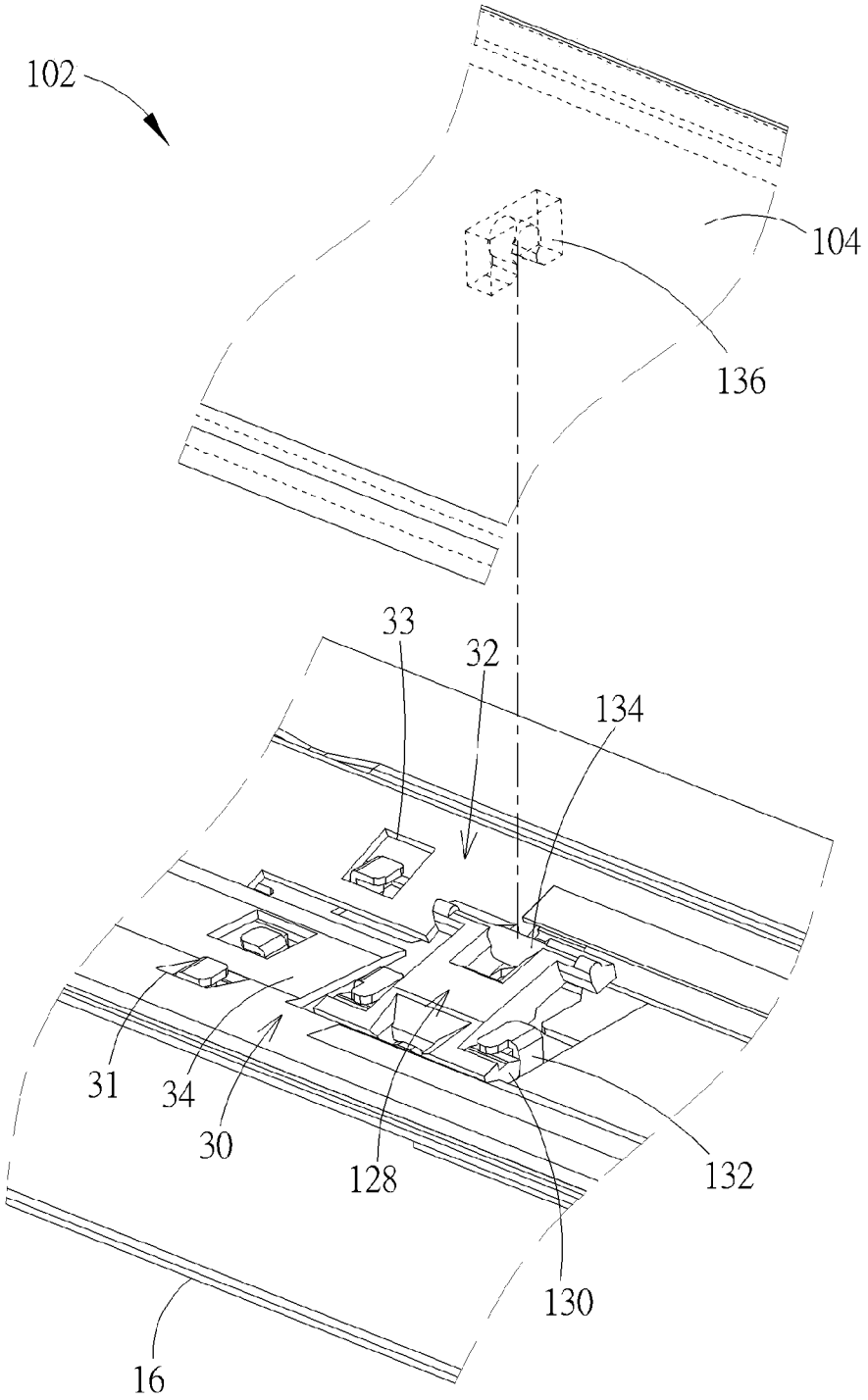
FIG. 9 is a partial enlarged exploded diagram of a keyswitch in FIG. 7.

In practical application, the keyswitch 100 could further utilize an auxiliary support to improve the motion steadiness of the cap 104. For example, please refer to FIG. 7 and FIG. 9. FIG. 9 is a partial enlarged exploded diagram of the keyswitch 102 in FIG. 7. As shown in FIG. 7 and FIG. 9, the keyswitch 102 could further include at least one auxiliary support 128 (two shown in FIG. 7, but not limited thereto). The auxiliary support 128 is disposed between the cap 104 and the baseplate 16 and is alternately arranged with the scissor support mechanism 106. The auxiliary support 128 is movably connected to the baseplate 16 and the cap 104. To be more specific in this embodiment, the auxiliary support 128 could have a first engaging structure 130 corresponding to the baseplate 16, and the baseplate 16 could have a second engaging structure 132 corresponding to the first engaging structure 130. The first engaging structure 130 is engaged with the second engaging structure 132 (e.g. via the structural engagement design of the sliding portion (could be regarded as the first engaging structure 130) and the sliding slot (could be regarded as the second engaging structure 132) as shown in FIG. 9, but not limited thereto), to make the auxiliary support 128 movably connected to the baseplate 16. Furthermore, the auxiliary support 128 could have a third engaging structure 134 corresponding to the cap 104, and the cap 104 could have a fourth engaging structure 136 corresponding to the third engaging structure 134. The third engaging structure 134 is engaged with the fourth engaging structure 136 (e.g. via the structural engagement design of the pivot portion (could be regarded as the third engaging structure 134) and the engaging slot (could be regarded as the fourth engaging structure 136) as shown in FIG. 9, but not limited thereto), to make the auxiliary support 128 movably connected to the cap 104.

Figure 10:
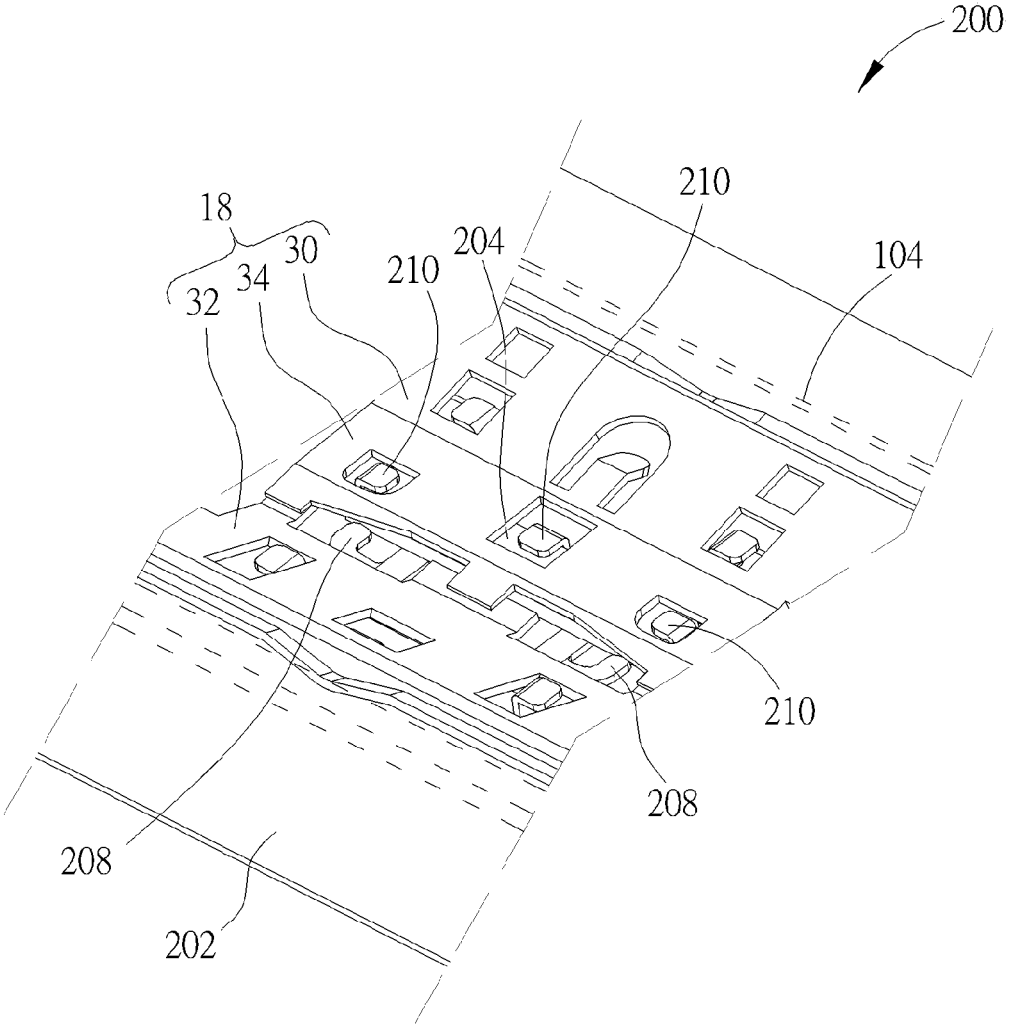
FIG. 10 is a partial diagram of a keyswitch according to another embodiment of the present invention.
Figure 11:
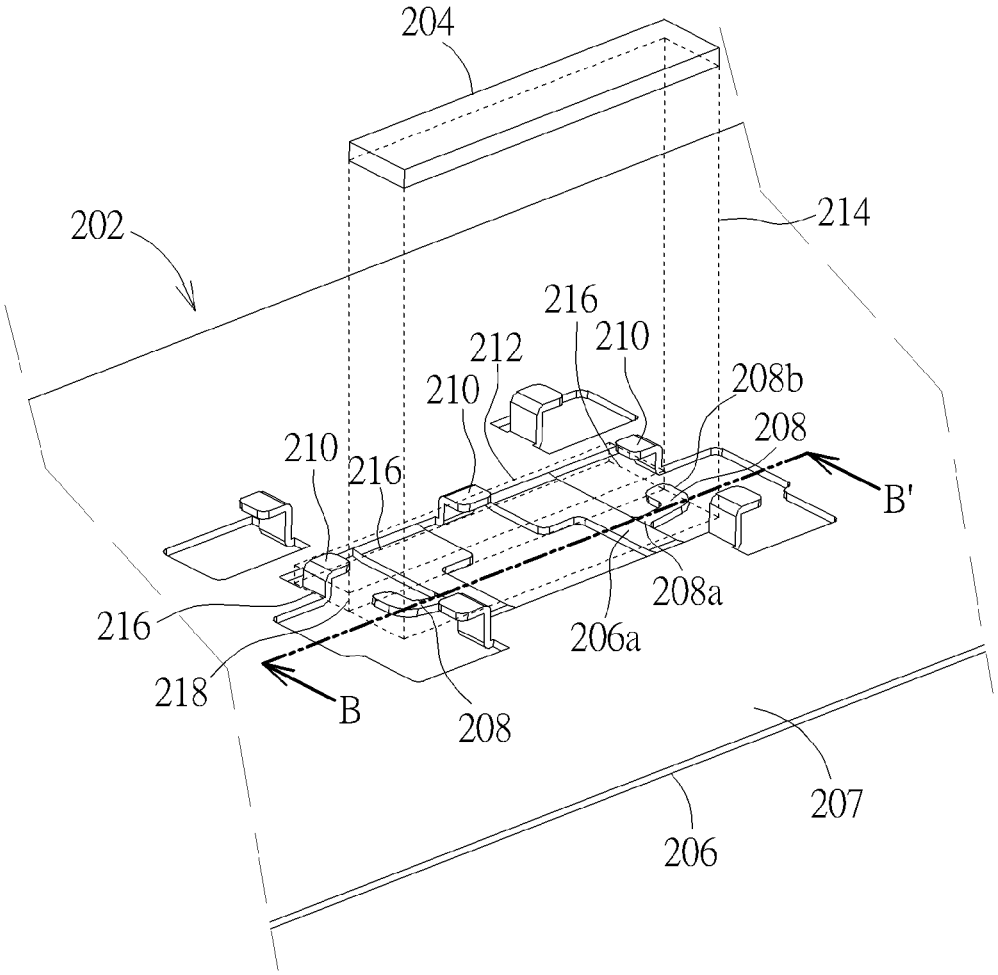
FIG. 11 is a diagram showing that a magnetic member in FIG. 10 has not been assembled with a baseplate yet.
Figure 11A:
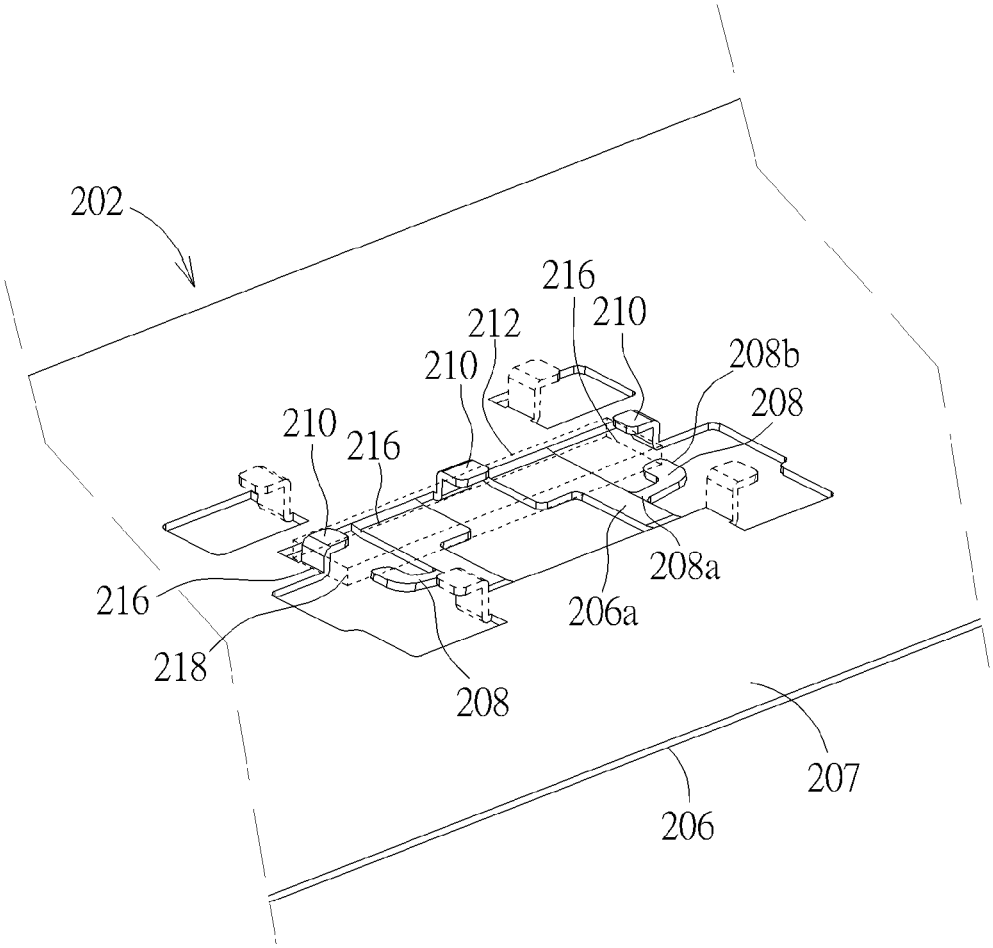
FIG. 11A is a diagram of the baseplate in FIG. 11.
Figure 12:
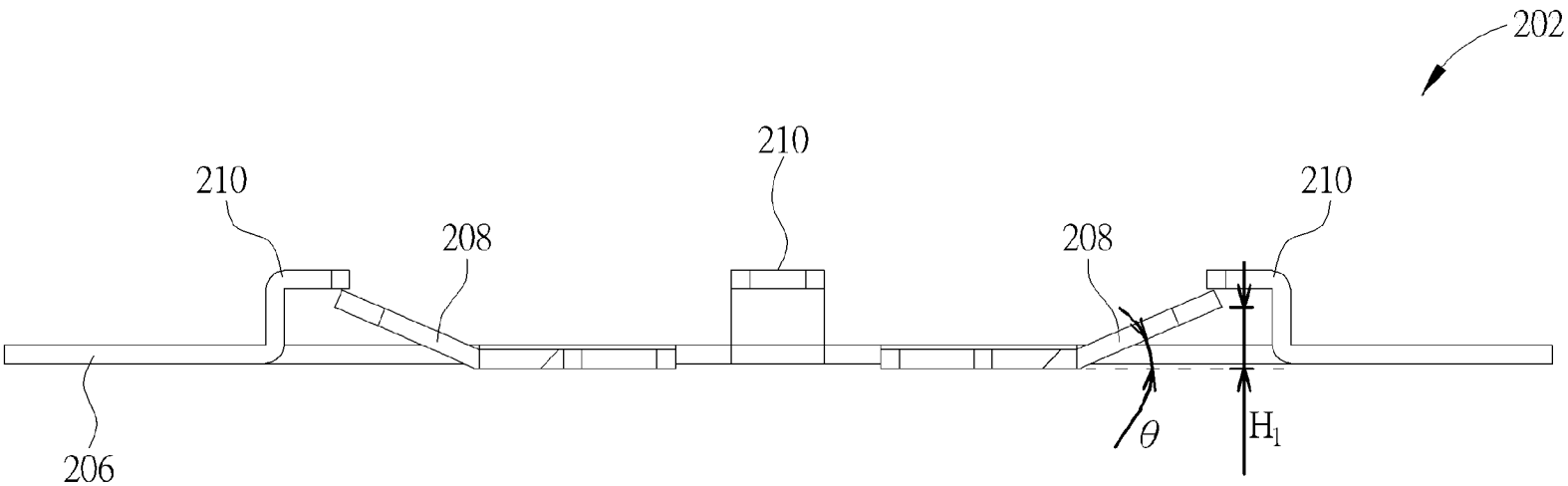
FIG. 12 is a cross-sectional diagram of the baseplate in FIG. 11 along a cross-sectional line B-B'.

Furthermore, the present invention could utilize an elastic member to prevent the magnetic member from falling out of the baseplate. For example, please refer to FIG. 10, FIG. 11, FIG. 11A, and FIG. 12. FIG. 10 is a partial diagram of a keyswitch 200 according to another embodiment of the present invention. FIG. 11 is a diagram showing that a magnetic member 204 in FIG. 10 has not been assembled with a baseplate 202 yet. FIG. 11A is a diagram of the baseplate 202 in FIG. 11. FIG. 12 is a cross-sectional diagram of the baseplate 202 in FIG. 11 along a cross-sectional line B-B'. For clearly showing the mechanical design of the keyswitch 200, the cap 104 is briefly depicted by dotted lines in FIG. 10. Components both mentioned in this embodiment and the aforesaid embodiments represent components with similar structures or functions, and the related description is omitted herein. As shown in FIG. 10, FIG. 11, FIG. 11A, and FIG. 12, the keyswitch 200 includes the cap 104, the support structure 18, the baseplate 202, and the magnetic member 204. The baseplate 202 has a main body 206, at least one elastic member 208 (two elastic members 208 extends obliquely and symmetrically as shown in FIG. 11, but not limited thereto), a plurality of blocking members 210, a receiving space 212, and an assembly path space 214. The main body 206 has an extending portion 206a located under the receiving space 212 (as shown in FIG. 11). The elastic member 208 is disposed on the main body 206 and extends into the assembly path space 214 and has a first height $H_1$ in an undeformed state as shown in FIG. 12. The receiving space 212 has at least one blocking side 216 (three shown in FIG. 11, but not limited thereto) and an opening 218. The blocking member 210 is disposed at the blocking side 216. The opening 218 is disposed at a position different from the blocking side 216, meaning that the opening 218 is located at a horizontal side of the receiving space 212. In this embodiment, the assembly path space 214 extends upward from an upper surface 207 of the main body 206, and the elastic member 208 extends obliquely along the main body 206 and is preferably L-shaped. A width of a root portion 208a of the elastic member 208 connected to the main body 206 is less than a width of a tail portion 208b of the elastic member 208 (but not limited thereto), so that the elastic member 208 could deform easily due to the small width of the root portion 208a and the tail portion 208b could fix the magnetic member 204 steadily in the receiving space 212 due to the large width of the tail portion 208b. Furthermore, an angle θ between the elastic member 208 and the baseplate 206 could preferably be less than 45° (but not limited thereto), so as to make the elastic member 208 have less deformation to decrease an external force needed for assembly of the magnetic member 204. As for description for other related structural designs of the keyswitch 200 (e.g. the cap triggering design, the scissor mechanical design, the auxiliary frame design, etc.), it could be reasoned by analogy according to the aforesaid embodiments and omitted herein.

Figure 13:
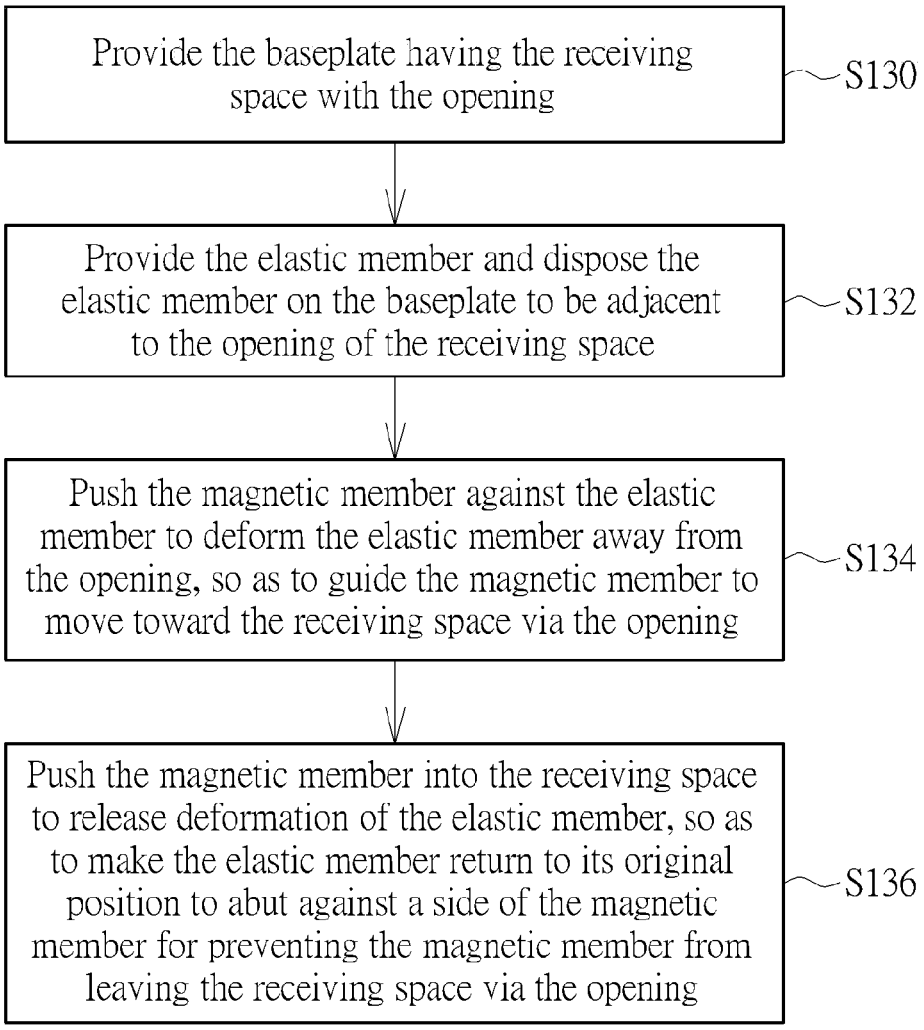
FIG. 13 is a flowchart of a keyswitch manufacturing method according to an embodiment of the present invention.
Figure 14:
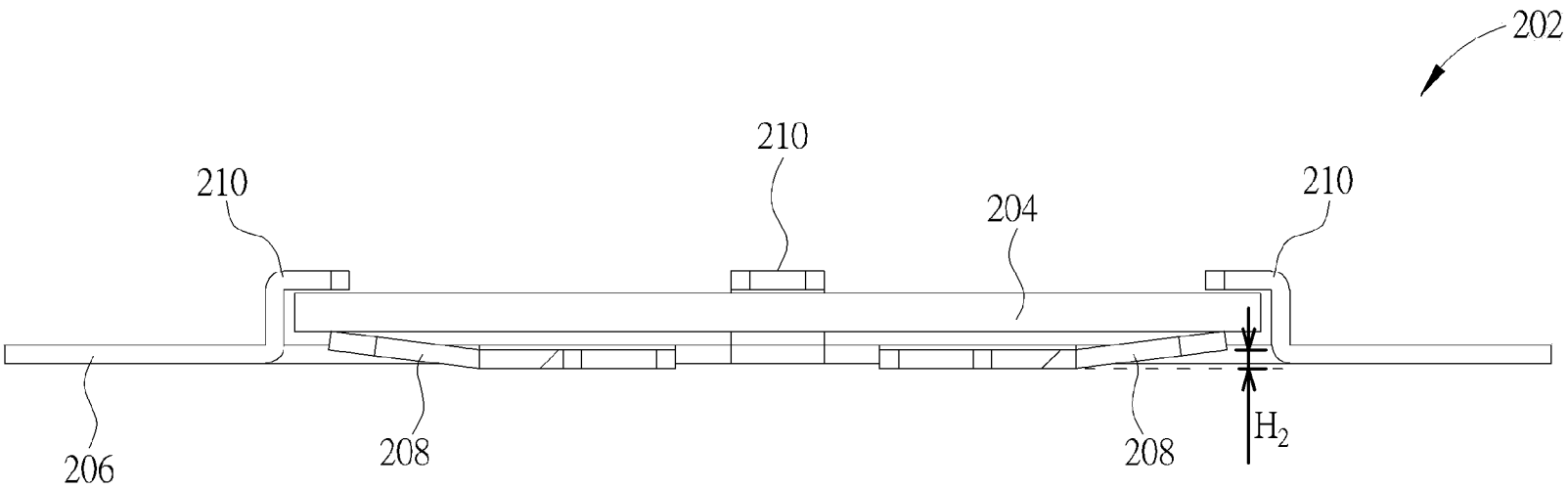
FIG. 14 is a cross-sectional diagram of an elastic member in FIG. 12 being deformed by pushing of the magnetic member.
Figure 15:
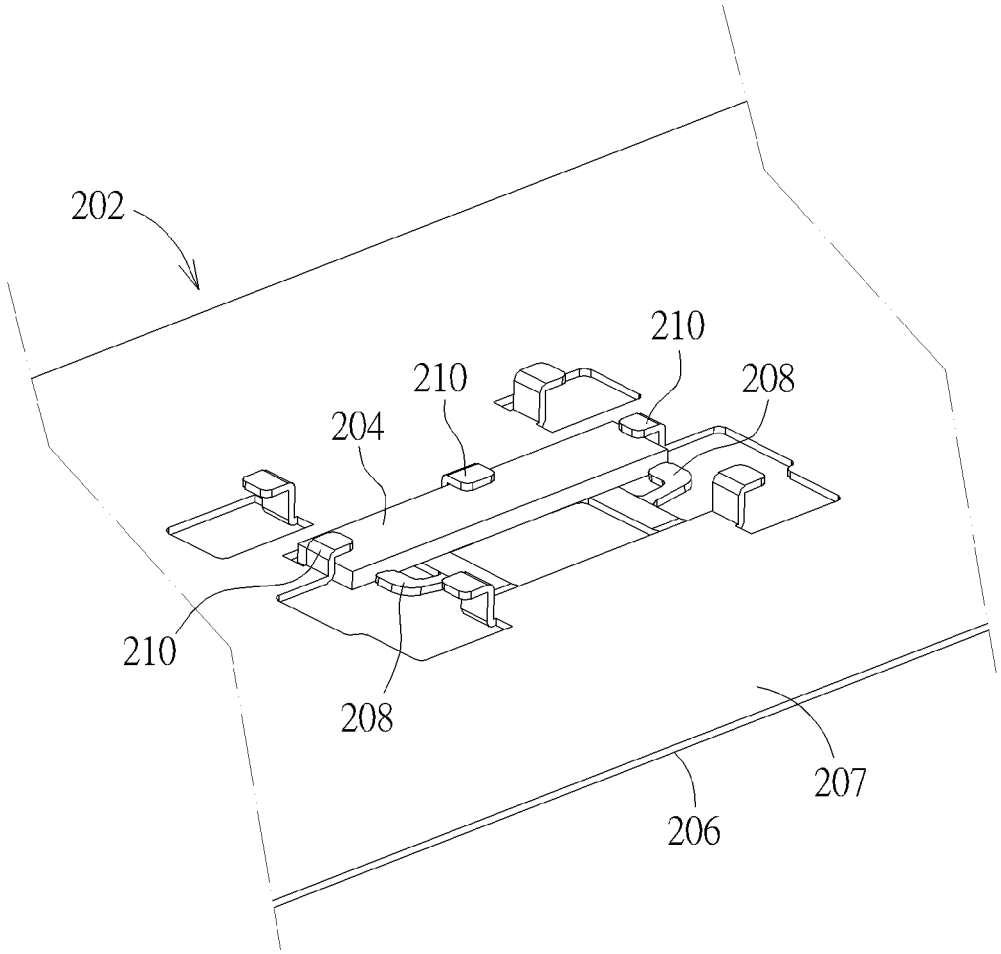
FIG. 15 is a diagram of the elastic member in FIG. 14 returning to its original position to abut against a side of the magnetic member.

Via the aforesaid designs, the magnetic member 204 could enter the receiving space 212 to be located under the magnetic permeable plate 34 according to the keyswitch manufacturing method of the present invention. Accordingly, the keyswitch 200 could provide a pressing resistance force or a returning force to the cap 104 via the magnetic attraction force of the magnetic member 204. In brief, please refer to FIG. 11, FIG. 12, FIG. 13, FIG. 14, and FIG. 15. FIG. 13 is a flowchart of a keyswitch manufacturing method according to an embodiment of the present invention. FIG. 14 is a cross-sectional diagram of the elastic member 208 in FIG. 12 being deformed by pushing of the magnetic member 204. FIG. 15 is a diagram of the elastic member 208 in FIG. 14 returning to its original position to abut against a side of the magnetic member 204. As shown in FIG. 11, FIG. 12, FIG. 13, FIG. 14, and FIG. 15, after providing the baseplate 202 (Step S130) and disposing the elastic member 208 on the baseplate 202 to be adjacent to the opening 218 (Step S132), the magnetic member 204 could be pushed against the elastic member 208 (Step 5134) to deform the elastic member 208 away from the opening 218, so as to guide the magnetic member 204 to move toward the receiving space 212 via the opening 218. To be more specific, in Step 5134, the magnetic member 204 could pass through the opening 218 along the assembly path space 214 to enter the receiving space 212 where the plurality of blocking members 210 engages with the magnetic member 204 (i.e. the magnetic member 204 is constrained by the plurality of blocking members 210 and an extending portion 206a of the baseplate 206 in the receiving space 212). During the magnetic member 204 passes through the opening 208, the magnetic member 204 enters the assembly path space 214 to deform the elastic member 208 from the first height $H_1$ as shown in FIG. 12 to a second height $H_2$ as shown in FIG. 14 on the baseplate 206. The second height $H_2$ is lower than the first height $H_1$ to allow the magnetic member 204 to pass through the opening 218 along the assembly path space 214. Finally, in Step 5136, the magnetic member 204 could be pushed to enter the receiving space 212 to release deformation of the elastic member 208, so as to make the elastic member 208 return to its original position to abut against a side of the magnetic member 204 (as shown in FIG. 15) for preventing the magnetic member 204 from leaving the receiving space 212 via the opening 218. In other words, after the magnetic member 204 passes through the opening 218, the magnetic member 204 leaves the assembly path space 214 to release deformation of the elastic member 208, so as to make the elastic member 208 return to the first height $H_1$ for blocking the magnetic member 204 from leaving the receiving space 212 via the assembly path space 214. In such a manner, the keyswitch 200 provided by the present invention could efficiently prevent the magnetic member 204 from falling out of the baseplate 202.

After the aforesaid process for disposing the magnetic member 204 in the receiving space 212 is completed, the keyswitch 200 could provide a pressing resistance force or a returning force to the cap 104 via the magnetic attraction force of the magnetic member 204. In brief, when the cap 104 is released, the magnetic attraction force between the magnetic member 204 and the magnetic permeable plate 34 keeps the cap 104 at the released position. When the cap 104 is pressed by an external force to make the magnetic permeable plate 34 away from the magnetic member 204 with rotation of the first support member 30 and the second support member 32, the cap 104 moves from the released position toward the pressed position with the support structure 18. When the external force is released, the aforesaid magnetic attraction force drives the magnetic permeable plate 34 to approach the magnetic member 204 to make the cap 104 move from the pressed position to the released position with rotation of the first support member 30 and the second support member 32. As for more detailed description for the aforesaid components, it could be reasoned by analogy according to the aforesaid embodiments and omitted herein.

Figure 16:
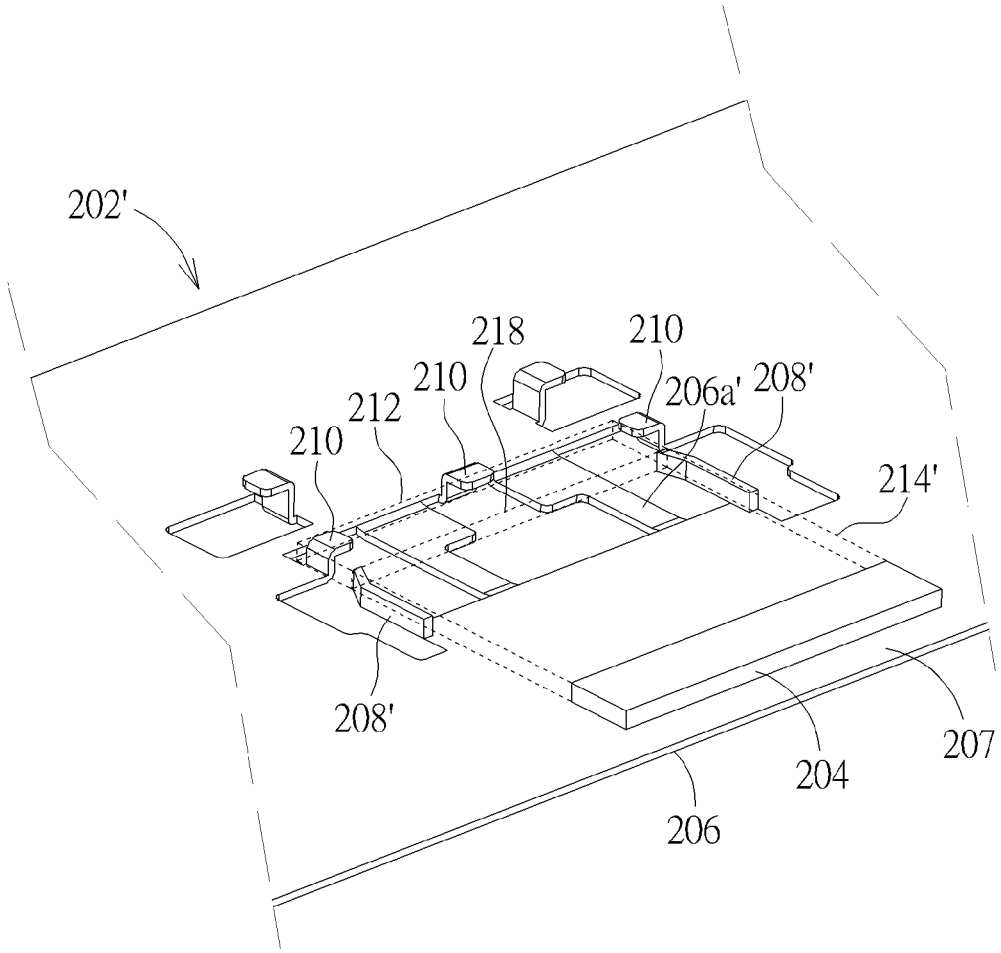
FIG. 16 is a diagram showing that the elastic member has not been assembled with a baseplate yet according to another embodiment of the present invention.

It should be mentioned that the structural design of the elastic member is not limited to the aforesaid embodiment, meaning that the present invention could adopt the design the elastic member could deform laterally. For example, please refer to FIG. 16, which is a diagram showing that the elastic member 204 has not been assembled with a baseplate 202' yet according to another embodiment of the present invention. Components both mentioned in this embodiment and the aforesaid embodiments represent components with similar structures or functions, and the related description is omitted herein. Furthermore, the related designs for the keyswitch including the elastic member 204 and the baseplate 202' (e.g. the support structure design, the cap triggering design, the scissor mechanical design, the auxiliary frame design, etc.) could be reasoned by analogy according to the aforesaid embodiments and omitted herein. The baseplate 202' has the main body 206, at least one elastic member 208' (two elastic members 208' disposed symmetrically on the main body 206 as shown in FIG. 16, but not limited thereto), the plurality of blocking members 210, the receiving space 212, and an assembly path space 214'. The elastic member 208' is disposed on the main body 206 and extends into the assembly path space 214'. The elastic member 208' has a first interference in an undeformed state with the assembly path space 214' as shown in FIG. 16. In this embodiment, the assembly path space 214' extends planarly on the upper surface 207 of the main body 206, and the elastic member 208' bends inwardly along the assembly path space 214'. Furthermore, the main body 206 has an extending portion 206a' located under the receiving space 212.

Figure 17:
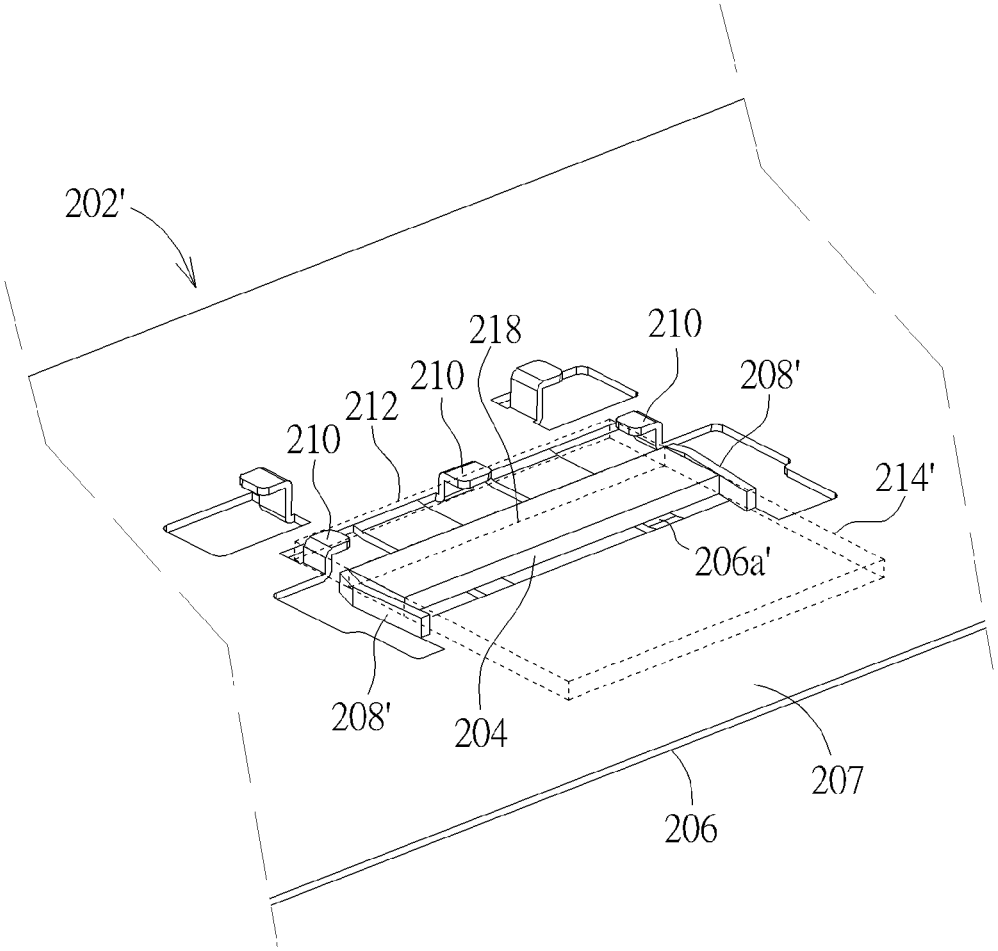
FIG. 17 is a diagram of the magnetic member in FIG. 16 deforming an elastic member.
Figure 18:
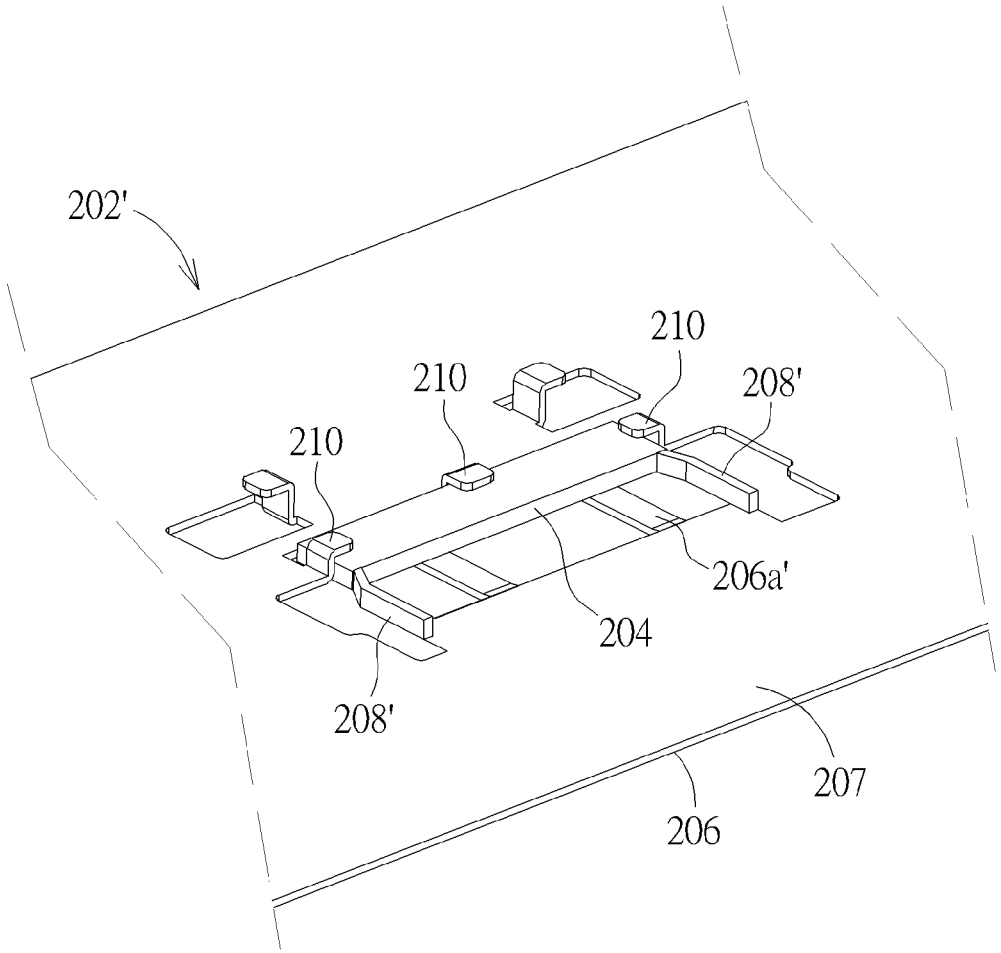
FIG. 18 is a diagram of the elastic member in FIG. 17 returning to its original position to abut against a side of the magnetic member.

Via the aforesaid designs, the magnetic member 204 could pass through the opening 218 along the assembly path space 214' to enter the receiving space 212 where the plurality of blocking members 210 engages with the magnetic member 204 (i.e. the magnetic member 204 is constrained by the plurality of blocking members 210 and the extending portion 206a' in the receiving space 212). In brief, please refer to FIG. 16, FIG. 17, and FIG. 18. FIG. 17 is a diagram of the magnetic member 204 in FIG. 16 deforming the elastic member 208'. FIG. 18 is a diagram of the elastic member 208' in FIG. 17 returning to its original position to abut against a side of the magnetic member 204. As shown in FIG. 16, FIG. 17, and FIG. 18, during the magnetic member 204 passes through the opening 208, the magnetic member 204 enters the assembly path space 214' to deform the elastic member 208' to have a second interference with the assembly path space 214' as shown in FIG. 17. The second interference as shown in FIG. 17 is less than the first interference as shown in FIG. 16 to allow the magnetic member 204 to pass through the opening 218 along the assembly path space 214'. After the magnetic member 204 passes through the opening 218, the magnetic member 204 leaves the assembly path space 214' to release deformation of the elastic member 208', so as to make the elastic member 208' return to have the first interference as shown in FIG. 16 for blocking the magnetic member 204 from leaving the receiving space 212 via the assembly path space 214'. In such a manner, the present invention could efficiently prevent the magnetic member 204 from falling out of the baseplate 202'.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A keyswitch comprising:

a baseplate extending along a plane defined by an X-axis and a Y-axis perpendicular to each other and having at least one bending arm and at least one support rib, a Z-axis being perpendicular to the X-axis and the Y-axis, the at least one bending arm protruding from the baseplate along the Z-axis, the at least one support rib extending along the plane defined by the X-axis and the Y-axis to form a receiving space cooperatively with the at least one bending arm;

a cap;

a support structure disposed between the baseplate and the cap, the support structure comprising a first support member and a magnetic permeable plate, the first support member being movably connected to the baseplate and the cap to make the cap move with the support structure between a released position and a pressed position, the magnetic permeable plate extending from the first support member and being positioned above the receiving space; and a first magnet laterally inserted into the receiving space along the plane defined by the X-axis and the Y-axis, the first magnet having a bottom surface and a lateral surface, the bottom surface being supported by the at least one support rib and the lateral surface being pressed by the at least one bending arm laterally;

wherein when the cap is released, a magnetic attraction force between the first magnet and the magnetic permeable plate keeps the cap at the released position;

when the cap is pressed by an external force to make the magnetic permeable plate away from the first magnet with rotation of the first support member, the cap moves from the released position toward the pressed position.

2. The keyswitch of claim 1 further comprising:

a second magnet magnetically attracted to the bottom surface of the first magnet opposite to the support structure.

3. The keyswitch of claim 1 further comprising:

a mylar film attached under the baseplate.

4. The keyswitch of claim 1 further comprising:

at least one auxiliary support disposed between the cap and the baseplate and alternately arranged with the support structure, the at least one auxiliary support being movably connected to the baseplate and the cap.

5. The keyswitch of claim 1, wherein the keyswitch further comprises a membrane circuit board, the first support member has a protruding point, the membrane circuit board is disposed on the baseplate and has a triggering switch corresponding to the protruding point, and when the cap is pressed to the pressed position, the protruding point triggers the triggering switch.

6. The keyswitch of claim 1, wherein the support structure further comprises a second support member opposite to the first support member and movably connected to the baseplate and the cap, an abutting portion extends from the second support member toward the first support member to support the magnetic permeable plate, and when the cap is pressed by the external force to make the magnetic permeable plate away from the first magnet with rotation of the first support member and the second support member and keep the abutting portion tilted, the cap moves from the released position to the pressed position with the support structure.

7. The keyswitch of claim 6, wherein the cap, the first support member, and the second support member are strip-shaped, the keyswitch further comprises at least one scissor support mechanism, and the at least one scissor support mechanism is located between the first support member and the second support member and is movably connected to the cap and the baseplate.

8. A keyboard comprising:

a baseplate extending along a plane defined by an X-axis and a Y-axis perpendicular to each other and having at least one bending arm and at least one support rib, a Z-axis being perpendicular to the X-axis and the Y-axis, the at least one bending arm protruding from the baseplate along the Z-axis, the at least one support rib extending along the plane defined by the X-axis and the Y-axis to form a receiving space cooperatively with the at least one bending arm; and a plurality of keyswitches disposed on the baseplate, at least one of the plurality of keyswitches comprising:

a cap;

a support structure disposed between the baseplate and the cap, the support structure comprising a first support member and a magnetic permeable plate, the first support member being movably connected to the baseplate and the cap to make the cap move with the support structure between a released position and a pressed position, the magnetic permeable plate extending from the first support member and being positioned above the receiving space; and a first magnet laterally inserted into the receiving space along the plane defined by the X-axis and the Y-axis, the first magnet having a bottom surface and a lateral surface, the bottom surface being supported by the at least one support rib and the lateral surface being pressed by the at least one bending arm laterally;

wherein when the cap is released, a magnetic attraction force between the first magnet and the magnetic permeable plate keeps the cap at the released position;

when the cap is pressed by an external force to make the magnetic permeable plate away from the first magnet with rotation of the first support member, the cap moves from the released position toward the pressed position.

9. The keyboard of claim 8, wherein the at least one of the plurality of keyswitches further comprises:

a second magnet magnetically attracted to the bottom surface of the first magnet opposite to the support structure.

10. The keyboard of claim 8 further comprising:

a mylar film attached under the baseplate.

11. The keyboard of claim 8, wherein the at least one of the plurality of keyswitches further comprises:

at least one auxiliary support disposed between the cap and the baseplate and alternately arranged with the support structure, the at least one auxiliary support being movably connected to the baseplate and the cap.

12. The keyboard of claim 8, wherein the keyboard further comprises a membrane board, the first support member has a protruding point, the membrane circuit board is disposed on the baseplate and has a triggering switch corresponding to the protruding point, and when the cap is pressed to the pressed position, the protruding point triggers the triggering switch.

13. The keyboard of claim 8, wherein the support structure further comprises a second support member opposite to the first support member and movably connected to the baseplate and the cap, an abutting portion extends from the second support member toward the first support member to support the magnetic permeable plate, and when the cap is pressed by the external force to make the magnetic permeable plate away from the first magnet with rotation of the first support member and the second support member and keep the abutting portion tilted, the cap moves from the released position to the pressed position with the support structure.

14. The keyboard of claim 13, wherein the cap, the first support member, and the second support member are strip-shaped, the keyswitch further comprises at least one scissor support mechanism, and the at least one scissor support mechanism is located between the first support member and the second support member and is movably connected to the cap and the baseplate.

15. A keyswitch manufacturing method for manufacturing a keyswitch, the keyswitch providing a pressing resistance force or a returning force to a cap via a magnetic attraction force of a magnetic member, the keyswitch manufacturing method comprising:

providing a baseplate, the baseplate having a receiving space, the receiving space having an opening located at a side of the receiving space not facing the cap;

providing an elastic member disposed on the baseplate to be adjacent to the opening;

pushing the magnetic member against the elastic member to deform the elastic member away from the opening, so as to guide the magnetic member to move toward the receiving space via the opening; and pushing the magnetic member into the receiving space to release deformation of the elastic member, so as to make the elastic member return to its original position to abut against a side of the magnetic member for preventing the magnetic member from leaving the receiving space via the opening.

16. A keyswitch comprising:

a cap;

a baseplate having a main body, an elastic member, a plurality of blocking members, a receiving space, and an assembly path space, the main body partially extending under the receiving space, the elastic member being disposed on the main body and extending into the assembly path space, the elastic member having a first height in an undeformed state, the [assembly path space] *receiving space* having at least one blocking side and an opening, the plurality of blocking members being disposed at the at least one blocking side, the opening being disposed at a position different from the at least one blocking side;

a support structure disposed between the baseplate and the cap, the support structure comprising a first support member and a magnetic permeable plate, the first support member being movably connected to the baseplate and the cap to make the cap move with the support structure between a released position and a pressed position, the magnetic permeable plate extending from the first support member and being positioned above the receiving space; and a magnetic member;

wherein [the magnetic member passes through the opening along the assembly path space to enter the receiving space where the plurality of blocking members engages with the magnetic member;

during the magnetic member passes through the opening, the magnetic member enters the assembly path space to deform] the elastic member *is deformed* to a second height *when the magnetic member is located within the assembly path space and neighboring to the opening, and the second height is* lower than the first height[, so as to allow the magnetic member to pass through the opening along the assembly path space];

[after the magnetic member passes through the opening, the magnetic member leaves the assembly path space to release] deformation of the elastic member *is released when the magnetic member is positioned in the receiving space and engaged with the plurality of blocking members*, so as to make the elastic member return to the first height for preventing the magnetic member from leaving the receiving space via the assembly path space;

when the cap is released, a magnetic attraction force between the magnetic member and the magnetic permeable plate keeps the cap at the released position; when the cap is pressed by an external force to make the magnetic permeable plate away from the magnetic member with rotation of the first support member, the cap moves from the released position toward the pressed position.

17. The keyswitch of claim 16, wherein the assembly path space extends upward from an upper surface of the main body.

18. The keyswitch of claim 16, wherein the elastic member extends obliquely along the main body, and an angle between the elastic member and the main body is less than 45'.

19. The keyswitch of claim 16, wherein the support structure further comprises a second support member opposite to the first support member and movably connected to the baseplate and the cap, an abutting portion extends from the second support member toward the first support member to support the magnetic permeable plate, and when the cap is pressed by the external force to make the magnetic permeable plate away from the magnetic member with rotation of the first support member and the second support member and keep the abutting portion tilted, the cap moves from the released position to the pressed position with the support structure.

20. A keyswitch comprising:

a cap;

a baseplate having a main body, an elastic member, a plurality of blocking members, a receiving space, and an assembly path space, the main body partially extending under the receiving space, the elastic member being disposed on the main body and extending into the assembly path space, the elastic member having a first interference in an undeformed state with the assembly path space, the [assembly path space] *receiving space* having at least one blocking side and an opening, the plurality of blocking members being disposed at the at least one blocking side, the opening being disposed at a position different from the at least one blocking side;

a support structure disposed between the baseplate and the cap, the support structure comprising a first support member and a magnetic permeable plate, the first support member being movably connected to the baseplate and the cap to make the cap move with the support structure between a released position and a pressed position, the magnetic permeable plate extending from the first support member and being positioned above the receiving space; and a magnetic member;

wherein [the magnetic member passes through the opening along the assembly path space to enter the receiving space where the plurality of blocking members engage with the magnetic member;

during the magnetic member passes through the opening, the magnetic member enters the assembly path space to deform] the elastic member *is deformed* to have a second interference with the assembly path space[, so as to allow the magnetic member to pass through the opening along the assembly path space] *when the magnetic member is located within the assembly path space and neighboring to the opening*, and the second interference is less than the first interference;

[after the magnetic member passes through the opening, the magnetic member leaves the assembly path space to release] deformation of the elastic member *is released when the magnetic member is positioned in the receiving space and engaged with the plurality of blocking members*, so as to make the elastic member return to have the first interference for preventing the magnetic member from leaving the receiving space via the assembly path space;

when the cap is released, a magnetic attraction force between the magnetic member and the magnetic permeable plate keeps the cap at the released position; when the cap is pressed by an external force to make the magnetic permeable plate away from the magnetic member with rotation of the first support member, the cap moves from the released position toward the pressed position.

21. The keyswitch of claim 20, wherein the assembly path space extends planarly on an upper surface of the main body, and when the magnetic member enters the receiving space, the magnetic member is constrained by the plurality of blocking members and an extending portion of the main body under the receiving space.

22. The keyswitch of claim 20, wherein the support structure further comprises a second support member opposite to the first support member and movably connected to the baseplate and the cap, an abutting portion extends from the second support member toward the first support member to support the magnetic permeable plate, and when the cap is pressed by the external force to make the magnetic permeable plate away from the magnetic member with rotation of the first support member and the second support member and keep the abutting portion tilted, the cap moves from the released position to the pressed position with the support structure.

* * * * *